United States Patent
Larnholm et al.

(10) Patent No.: US 10,814,252 B2
(45) Date of Patent: Oct. 27, 2020

(54) SPHERICAL SEPARATION DEVICE AND METHOD FOR SEPARATION

(75) Inventors: Per-Reidar Larnholm, Moss (NO); Frederik Albert Lammers, Zoetermeer (NL)

(73) Assignee: Sulzer Management AG, Winterthur (CH)

( * ) Notice: Subject to any disclaimer, the term of this patent is extended or adjusted under 35 U.S.C. 154(b) by 1200 days.

(21) Appl. No.: 14/346,558

(22) PCT Filed: Aug. 13, 2012

(86) PCT No.: PCT/NL2012/050562
§ 371 (c)(1),
(2), (4) Date: Jul. 8, 2014

(87) PCT Pub. No.: WO2013/043042
PCT Pub. Date: Mar. 28, 2013

(65) Prior Publication Data
US 2014/0352538 A1    Dec. 4, 2014

(30) Foreign Application Priority Data

Sep. 23, 2011  (NL) .................................... 1039069

(51) Int. Cl.
| | | |
|---|---|---|
| *B01D 19/00* | (2006.01) | |
| *B01D 21/24* | (2006.01) | |
| *B01D 21/00* | (2006.01) | |
| *B01D 21/02* | (2006.01) | |
| *E21B 43/34* | (2006.01) | |

(52) U.S. Cl.
CPC ..... *B01D 21/2494* (2013.01); *B01D 19/0042* (2013.01); *B01D 21/0042* (2013.01); *B01D 21/10* (2013.01); *E21B 43/34* (2013.01)

(58) Field of Classification Search
CPC  B01D 21/2494; B01D 21/0042; B01D 21/10; B01D 19/00–0495; B01D 21/0039–0075; E21B 43/34
USPC ....................... 95/241, 254–259; 96/155, 220
See application file for complete search history.

(56) References Cited

U.S. PATENT DOCUMENTS

| | | | | |
|---|---|---|---|---|
| 2,489,370 | A | * 11/1949 | Fowler ............... | B01D 19/0021 55/428 |
| 2,756,837 | A | * 7/1956 | Lovelady ........... | B01D 19/0057 60/39.826 |
| 2,756,937 | A | * 7/1956 | Smith ................. | B02C 19/0087 241/99 |
| 2,861,647 | A | * 11/1958 | Musslewhite .......... | B01D 45/02 96/168 |
| 2,925,720 | A |   2/1960 | Dorsey et al. | |

(Continued)

FOREIGN PATENT DOCUMENTS

| | | |
|---|---|---|
| CA | 1182763 A1 | 2/1985 |
| GB | 1378260 A | 12/1974 |

(Continued)

*Primary Examiner* — T. Bennett McKenzie
(74) *Attorney, Agent, or Firm* — Larson & Anderson, LLC

(57) ABSTRACT

The present invention relates to an apparatus for separation of high volume flows of mixtures provided with at least two immiscible phases, especially for the first separation steps of flows of water/oil/gas/sand mixture that enter the apparatus as a wellstream mixture. The invention also relates to a method for separation of high volume flows of mixtures provided with at least immiscible phases.

18 Claims, 10 Drawing Sheets

(56) References Cited

U.S. PATENT DOCUMENTS

| | | | |
|---|---|---|---|
| 6,197,095 B1 * | 3/2001 | Ditria | B01D 19/0068 |
| | | | 166/267 |
| 6,537,458 B1 * | 3/2003 | Polderman | B01D 17/00 |
| | | | 210/188 |
| 6,752,860 B1 * | 6/2004 | Hoydal | B01D 17/0208 |
| | | | 96/157 |
| 7,785,400 B1 | 8/2010 | Worley et al. | |
| 2005/0173322 A1 | 8/2005 | Ostergaard | |
| 2007/0199703 A1 * | 8/2007 | Freeman | E21B 21/067 |
| | | | 166/267 |
| 2008/0105616 A1 * | 5/2008 | Allouche | B01D 17/0211 |
| | | | 210/637 |
| 2008/0156744 A1 * | 7/2008 | Atkinson | B01D 45/14 |
| | | | 210/787 |
| 2009/0152204 A1 | 6/2009 | Chantrel et al. | |
| 2011/0139625 A1 * | 6/2011 | Arntzen | B01D 17/0214 |
| | | | 204/662 |

FOREIGN PATENT DOCUMENTS

| | | |
|---|---|---|
| WO | 0174469 A1 | 10/2001 |
| WO | 2010114377 A1 | 10/2010 |
| WO | 2010131958 A1 | 11/2010 |

* cited by examiner

SPHERICAL SEPARATION DEVICE AND METHOD FOR SEPARATION

CROSS-REFERENCE TO RELATED APPLICATIONS

This application is the United States national phase of International Application No. PCT/NL2012/050562 filed Aug. 13, 2012, and claims priority to Netherlands Patent Application No. 1039069 filed Sep. 23, 2011, the disclosures of which are hereby incorporated in their entirety by reference.

BACKGROUND OF THE INVENTION

Field of the Invention

The present invention relates to an apparatus for separation of high volume flows of mixtures provided with at least two immiscible phases, like for instance gas/liquid mixtures, especially for the first separation steps of flows of water/oil/gas/sand mixture that enter the apparatus as a wellstream mixture, comprising: a vessel provided with: an inlet for the mixture provided with at least two immiscible phases; a separation interior; at least one outlet for a pre-separated substantially heavy fraction located on a lower side of the vessel; and another outlet for a pre-separated substantially light fraction located at the upper side of the vessel. The invention also relates to a method for separation of high volume flows of mixtures provided with at least two immiscible phases using such separation apparatus.

Description of Related Art

The separators used for separation of high volume flows of mixtures provided with at least two immiscible phases in the technology field of extraction of hydrocarbons (oil and gas) usually consist of large vessels (25-30 meters long) with an interior of separation equipment like plates, vortex breakers and so on. The volume flow to be processed is normally derived from a well as a wellstream and may be order of ten-thousands m$^3$/day. The resulting separation products usually consists in A) one ore more liquid flows (mainly oil and/or water), B) a substantial gas flow and C) a material flow of solid components like sand. The liquid flow A) may be a single oil gas flow but may also be pre-separated in a mainly oil flow A$_1$) and a mainly water flow A$_2$). The material flow of solid particles C) may also be combined with a liquid flow A). The resulting substantial gas phase fraction from such primary separation normally still contains a serious amount liquid to be further separated in e.g. a vessel containing among others a cyclone or other demister. The inlet is normally located on the upper side of one tail end of the vessel and the outlet for the substantial gas flow is located on upper side of the opposite tail end of the vessel. The liquid outlet(s) is (are) located below the liquid level of the fluid mixture that accumulates on the underside of the vessel, so on a lower location on the tail end side where also the gas outlet connects. The existing separation vessels are large and heavy.

It is an object of the present invention to provide an apparatus for separation of high volume flows of mixtures provided with at least two immiscible phases that combines adequate separation performances with a construction that is easier to handle and/or construct than the prior art separation devices.

SUMMARY OF THE INVENTION

The present invention provides an apparatus for separation wherein a vessel comprises at least one substantially spherical shaped casing to be designed for use under a substantially higher external pressure than 1 atmosphere, and wherein the apparatus also comprises at least one subsequent and/or preceding compact separator that connects to at least one of a heavy phase fraction outlet, light phase fraction outlets and/or an inlet for a mixture. The heavy phase outlet may be a substantial liquid outlet and the light phase outlet may be a substantial gas outlet. A specific embodiment of the preceding or subsequent compact separator of separation apparatus according the present invention is an inline separator. The advantage of making use of one or more compact type separators in combination with the substantially spherical shaped vessel is that these "generally pipe shaped" and or in different ways minimised volumetric separators require relative volume in relation to their capacity if compared to vessel type separators having an hold up volume. At the bottom of a vessel type separator is normally e.g. a "stand still" liquid volume provided as well as a "stand still" gas volume that may be provided at the top of the vessel. One or more of such "stand still" volumes (or compartments) make that the vessel is relative large if compared to compact type separators that do not require such collector space(s). The reason for still maintaining a pre-separation vessel is that a direct input of a high volume flow of a mixture provided with at least two immiscible phases, like a flow of oil/gas mixture direct from the well, is difficult to process immediately in a compact type separator. The reason is that such would lead to problems like slugging e.g. when the immiscible phases ratio is not constant in time. Thus a certain "vessel type" separation has to be maintained but may be combined with preceding compact separation and/or subsequent compact further separation. The compact type separator may e.g. be chosen from the group existing of: centrifugal separators, cyclone separators like demisting cyclones, demisting cylones (e.g. placed in one or more domes attached to the vessel), coalescers, and vortex separators. A pre-separation to a certain level is of the mixture provided with the at least two immiscible phases limits the required volume and the required length of the vessel required for such. Due to the inventive insight that the pre-separation may be less effective than the first separation step according the prior art also the demands towards the vessel are reduced. This makes it possible to make use of a more efficiently shaped vessel seen from a constructive and logistic point of view. The vessel may be constructed out of at least one substantially spherical shaped casing. The advantages of the separation apparatus according the invention are that the separation apparatus may be less voluminous that the prior art equipment providing equal separation capacity. Less volume provides the advantage of cheaper construction, easier transport and set up. Besides the smaller construction also the spherical shaped casing makes the demands for the casing thickness decrease compared to the prior art. A further advantage of more compact separation is that the resident time distribution of the light and/or heavy phase fractions in the preceding and/or subsequent separator (s) under stable conditions is constant. In relation to suited compact preceding and/or subsequent separators reference is made to in line separators as for instance disclosed in applicant's earlier patent applications WO2010/114377 and WO 2010/131958, which are incorporated herein by reference. The possibility remains to combine subsequent in line or compact separation with also one or more subsequent vessels for further processing the fractions coming from the substantially spherical vessel. In a specific embodiment a heavy phase fraction buffer in the substantially spherical vessel directly communicates with a light phase fraction buffer in a subsequent separating vessel.

As the substantially spherical shaped casing is designed for use under a substantially higher external pressure than 1 atmosphere the separation apparatus is especially suited for submersive use. So close to under water wells the separation apparatus may be placed at sea bed. Such submersive use demands for (dependent on, among others, the depth of the location of use) high reliability and minimal maintenance and is resulting in robust solid equipment with matching large wall thickness. Typically is a wall thickness of the spherical vessel of 25-150 mm.

In an embodiment the lower side of the vessel may be provided with a solid particle outlet. In the mixture to be separate also a fraction of solid material like sand may be present. Such fraction of solid material may be removed together with the heavy phase fraction to be removed from the heavy phase (e.g. liquid) later on. For such processing an inline de-sander can be used. As an alternative in situations where the fraction of solid material is larger it is also possible to provide a direct removal from at least a part of the fraction of solid material directly from the vessel with the at least one substantially spherical shaped casing.

Normally the wellpressure, or the remaining wellpressure on the mixture provided with at least two immiscible phases when entering the vessel of the separation apparatus according the present invention is lower than the external pressure exerted by the water surrounding the separation apparatus.

The separation interior may comprise flow guiding plates like baffles to provide the material to be separated a certain minimal residence time in the vessel and thus to provide a minimal time for the required pre-separation.

The vessel may comprise a single substantially spherical shaped casing but as an alternative to provide a larger capacity and/or better separation specifications the vessel may also comprise plural interconnected spherical shaped casings. The spherical shaped casings may be interconnected by e.g. welding together plural spherical parts provided with apertures. For a good result these apertures fit to one another and the remaining material of the spherical parts is medium-tight interconnected. In this respect "medium-tight" is used as referring to liquid-tight and gastight. A specific embodiment in this respect provides a vessel that comprises two (or more) stacked and interconnected spherical shaped casings.

The present invention also provides a method for separation of high volume flows of mixtures provided with at least two immiscible phases, especially for the first separation steps of flows of water/oil/gas/sand mixture that enter the apparatus as a wellstream mixture, comprising the steps of: A) feeding a high volume flow of the wellstream mixture to a pre-separation vessel provided with at least one substantially spherical shaped casing; B) pre-separating the wellstream mixture in the vessel; C) feeding the pre-separated substantial heavy phase fraction leaving the vessel to a subsequent separator, D) feeding the pre-separated substantial light phase fraction leaving the vessel to a subsequent separator, E) subsequent separation of the pre-separated substantial heavy phase fraction and the pre-separated substantial light phase fraction in the subsequent separators, wherein at least one of the subsequent separation processes and/or a preceding separation process takes place by through flow of that fraction through the subsequent and/or preceding separator. It is possible that the subsequent separation processes of the pre-separated substantial heavy phase fraction and the pre-separated substantial light phase fraction both take place by through flow of the fractions through the subsequent separators, but it is also an option to let only one of the two being compact processed. With this method the advantages as already mentioned in relation to the separation apparatus according the invention may be realised; they are also incorporated here in relation to the separation method of the present invention by reference. The most important advantages being that the inventions enables a high level of separation with, compared to the prior art separation equipment, a relative compact and light separation apparatus that is solid from design that may advantageously be applied in submerged situations not alone in relative shallow waters but also on greater depths.

The method may in a specific embodiment also provide the opportunity to pre-separate the wellstream mixture in the vessel according step B) such that it provides two different pre-separated wellstream fractions (e.g. two different liquid fractions, for instance a substantial water fraction and a substantial oil fraction). The flow through separator(s) for the substantial light phase fraction may be chosen such that the pre-separated substantial light phase fraction may contain a serious amount of liquid but for a favourable result (without danger of slugging) the pre-separation in the vessel takes place to a level wherein the substantial light phase gas fraction contains less than 40, less than 30, or less than 20 volume % of liquid. This (high) level of liquid in the light phase fraction makes the demands towards the separation capacity of the vessel relative low thus further enabling downsizing the vessel.

BRIEF DESCRIPTION OF THE DRAWINGS

The invention is further elucidated on the basis of the non-limitative exemplary embodiments shown in the following figures. Herein.

DESCRIPTION OF THE INVENTION

Figure 1A:
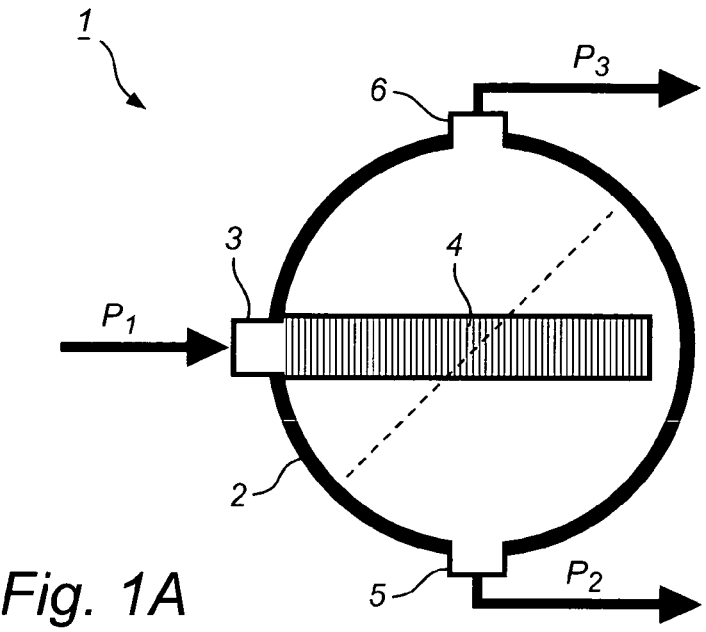
FIG. 1A shows a schematically represented a part of a first embodiment of the separation apparatus according the present invention.

FIG. 1A shows a part of a separation apparatus 1 with a spherical vessel 2 having an inlet 3 for feeding a wellstream mixture (e.g. a gas/liquid mixture) according arrow $P_1$ to the spherical vessel 2. In the spherical vessel 2 a vane diffuser 4 connect to the inlet 3 for enabling (partially) the separation of the inflowing wellstream mixture. At the lower side of the spherical vessel 2 a heavy phase outlet 5 (e.g. a liquid outlet) for the pre-separated substantial heavy fraction ($P_2$) is located while at the upper side of the spherical vessel 2 a gas outlet 6 for the pre-separated substantial light phase fraction ($P_3$) (e.g. a gas fraction) is located.

Figure 1B:
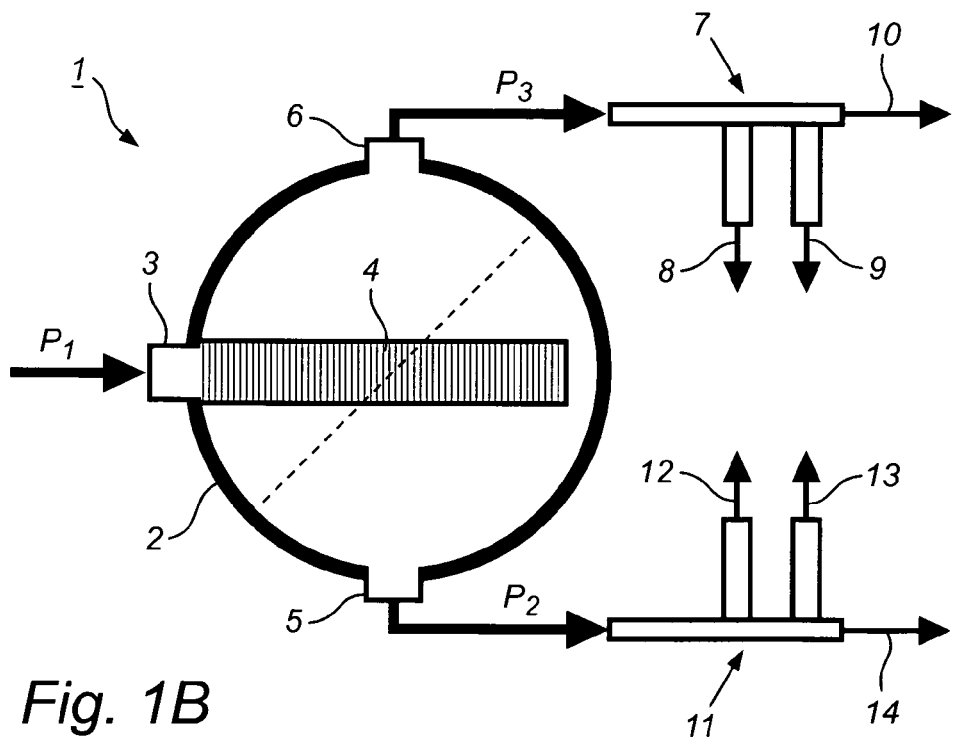
FIG. 1B shows schematically represented the full embodiment of the separation apparatus as already partially presented in FIG. 1A, now with additional subsequent in-line processing equipment.
Figure 1C:
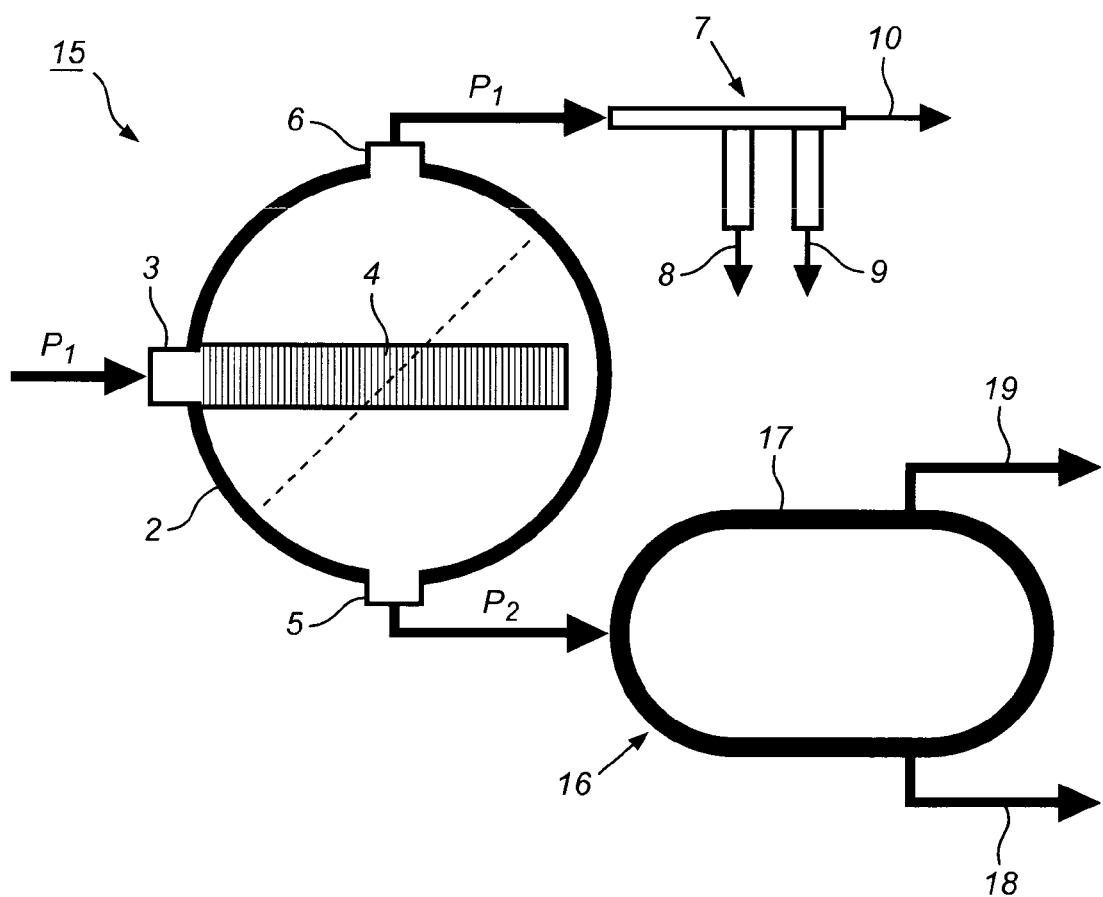
FIG. 1C schematically represented the full embodiment of the separation apparatus as partially presented in FIG. 1A with a second alternative additional processing equipment compared to FIG. 1B.

FIG. 1B shows separation apparatus 1 as already partially shown in FIG. 1A, now with a subsequent separator 7 of the compact type that connects to the light phase outlet 6. The subsequent separator 7 in its turn is provided with two liquid fraction outlets 8, 9 and a gas outlet 10. The separation apparatus 1 is also provided with a subsequent separator 11 of the compact type that connects to the heavy phase outlet 5. And also the subsequent separator 11 is again provided with two liquid fraction outlets 12, 13 and a gas outlet 14. FIG. 1C a separation apparatus 15 mainly in line the separation apparatus 1 as shown in FIG. 1B but now with an alternative subsequent separator 16 for the substantial heavy phase fraction leaving the spherical vessel 2 at the lower side of the via heavy phase outlet 5 ($P_2$). The subsequent separator 16 contains a vessel 17 with a lower heavy phase fraction outlet 18 and a higher light phase fraction outlet 19.

Figure 1D:
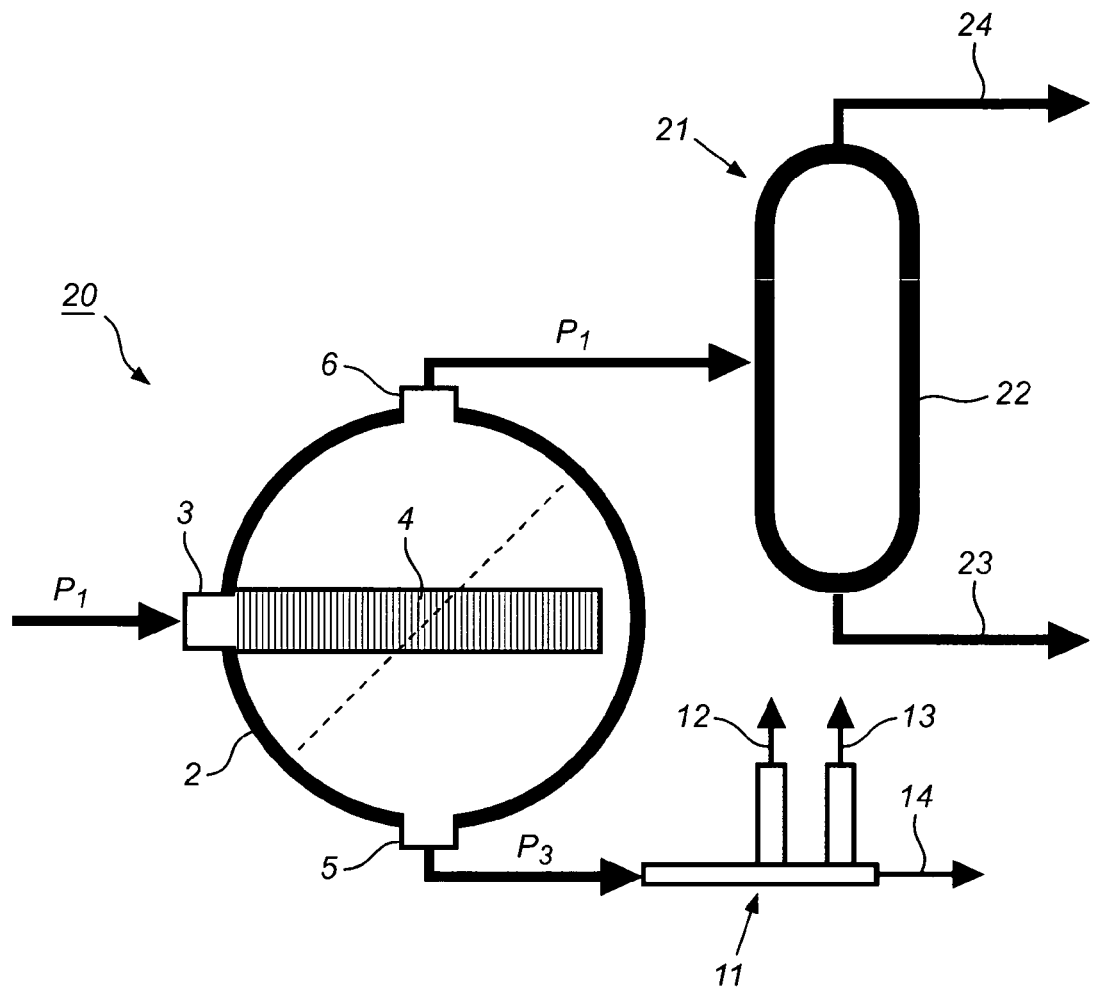
FIG. 1D shows schematically represented a full embodiment of the separation apparatus as partially presented in FIG. 1A with third alternative additional processing equipment compared to FIGS. 1B and 1C.

Now in FIG. 1D a separation apparatus 20 is again mainly in line the separation apparatus 1 as shown in FIG. 1B but in this embodiment an alternative subsequent separator 21 for the light phase fraction leaving the spherical vessel 2 at the higher side of the via light phase fraction outlet 6 ($P_3$). The subsequent separator 21 contains a vessel 22 with a lower heavy phase fraction outlet 23 and a higher light phase fraction outlet 24.

Figure 2A:
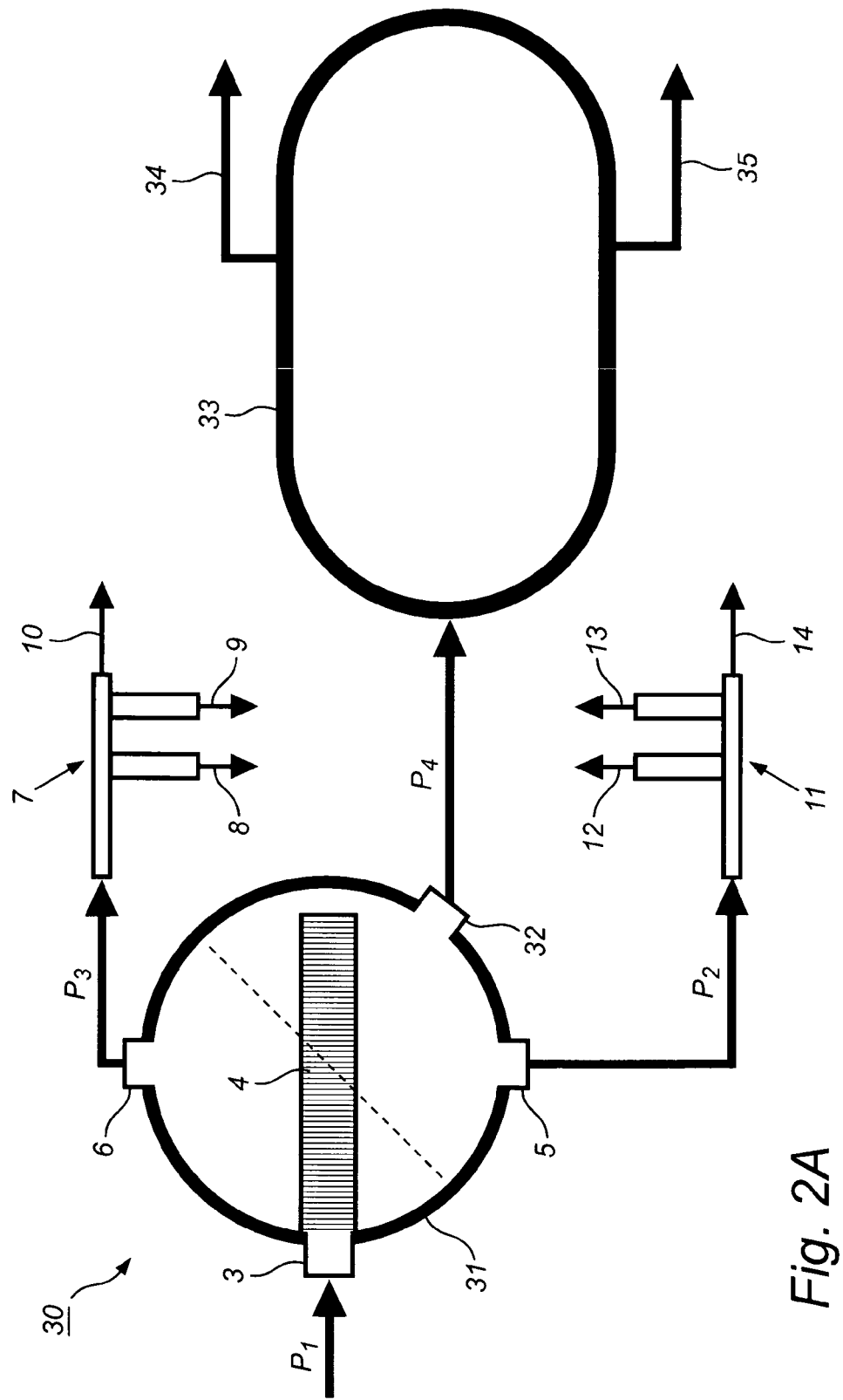
FIG. 2A shows an schematically represented second embodiment of the separation apparatus including additional subsequent processing equipment according the present invention.
Figure 2B:
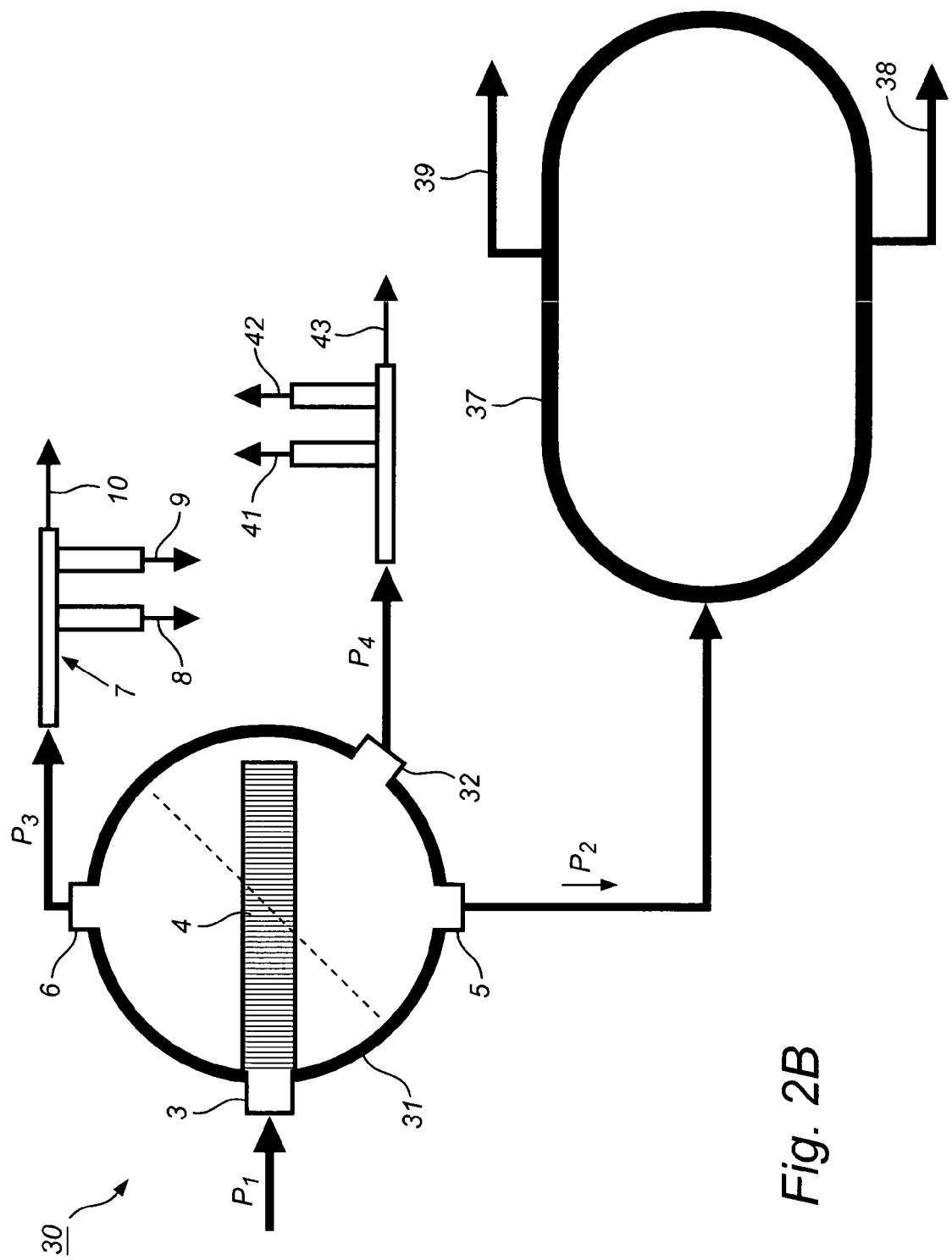
FIG. 2B shows the embodiment of the separation apparatus as presented in FIG. 2A with alternative additional subsequent processing equipment.

FIG. 2A shows a separation apparatus 30 that has in line with the embodiments shown in FIGS. 1A-1D, a spherical vessel 2 having an inlet 3 for feeding a wellstream mixture according arrow $P_1$ to the spherical vessel 31. Again in this embodiment in the spherical vessel 2 a vane diffuser 4 connects to the inlet 3 for enabling (partially) the separation of the inflowing wellstream mixture. Also at the lower side of the spherical vessel 2 a heavy phase fraction outlet 5 for the pre-separated substantial heavy phase fraction ($P_2$) is located while at the upper side of the spherical vessel 2 a light phase fraction outlet 6 for the pre-separated substantial light phase fraction ($P_3$) is located. Different from the previous embodiments however the spherical vessel 31 of the separation apparatus 30 is provided with a third outlet 32 for a third fraction ($P_4$), e.g. a substantial oil fraction. By adding the additional third outlet 32 for the removal of a the third fraction the fraction leaving the fraction ($P_2$) removed through the heavy phase fraction outlet 5 at the lower side of the spherical vessel 2 will now have a different composition (e.g. a larger component of water) as for the pre-separated substantial heavy phase fraction leaving the lower outlet 5 in the embodiments as shown in the FIGS. 1A-1D due to the fact that now also an additional fraction ($P_4$) is removed via outlet 32 (e.g. a fraction containing an enhanced oil component). The additional fraction ($P_4$) leaving the third outlet 32 is supplied to a further separation vessel 33 having again a light phase outlet 34 (e.g. a substantial gas outlet) and a heavy phase outlet 35 (e.g. a substantial water outlet). As can be seen from FIG. 2B it is also possible to vary the subsequent processing equipment connecting to the vessel 31. As shown in this embodiment now a vessel 37 having a heavy phase outlet 38 (here e.g. an oil outlet) and a light phase outlet 39 (here e.g. a gas outlet) is connecting to the heavy phase fraction outlet 5 (here e.g. a water outlet) feeding a substantial heavy phase fraction ($P_2$) (e.g. water) from the vessel 31 while the additional fraction ($P_4$) (e.g. containing an enhanced oil component) is removed via outlet 32 and is forwarded to a subsequent separator 40 of the compact type that in its turn is provided with two further heavy fraction (e.g. oil) outlets 41, 42 and a light phase fraction (e.g. gas) outlet 43.

Figure 3:
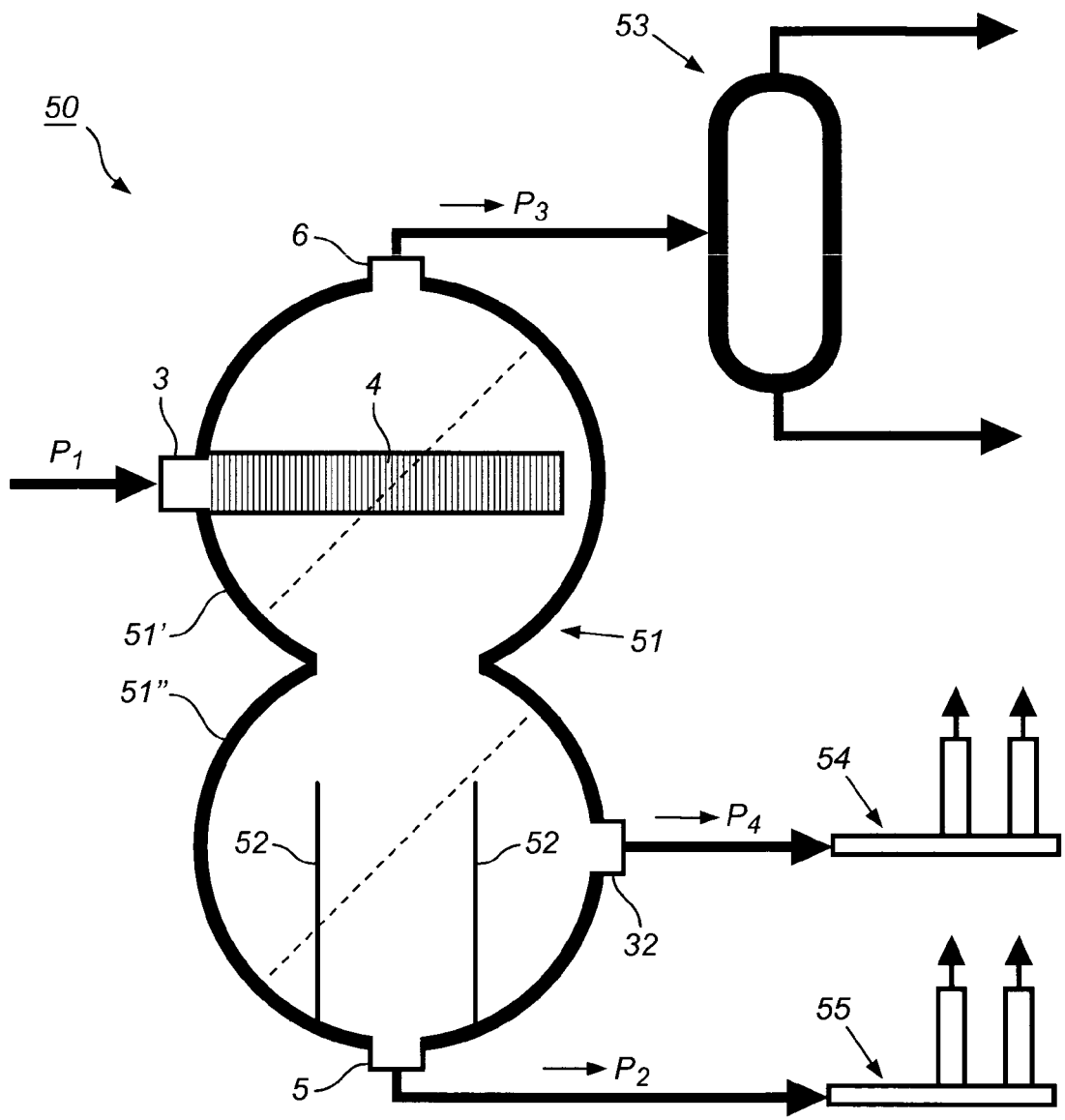
FIG. 3 shows an schematically represented third embodiment of the separation apparatus with a first type of additional subsequent processing equipment according the present invention.

Now in FIG. 3 a separation apparatus 50 is shown with a vessel 51 that is a combination of two stacked spherical vessel parts 51' and 51". An inlet 3 for feeding a wellstream mixture according arrow $P_1$ to the vessel 51 connects to the upper vessel part 51' and leads to vane diffuser 4 for enabling the pre-separation of the inflowing wellstream mixture. At the lower vessel part 51" the heavy phase (e.g. water) outlet 5 for the pre-separated substantial heavy phase fraction ($P_2$) (e.g. water) and the additional outlet 32 ($P_4$) (e.g. oil outlet) is located while at the upper vessel part 51' the light phase outlet 6 (e.g. gas outlet) for the pre-separated substantial light phase fraction ($P_3$) (e.g. substantial gas phase fraction) is located. To further improve the further (e.g. oil/water) separation in the lower vessel part 51" weirs 52 are placed in the lower vessel part 51". For the subsequent processing of the fractions ($P_2$, $P_3$, $P_4$) leaving the vessel 51 subsequent separators 53, 54 and 55 are provided. The subsequent separators 53, 54, 55 may be varied as has been shown in the previous embodiments.

Figure 4:
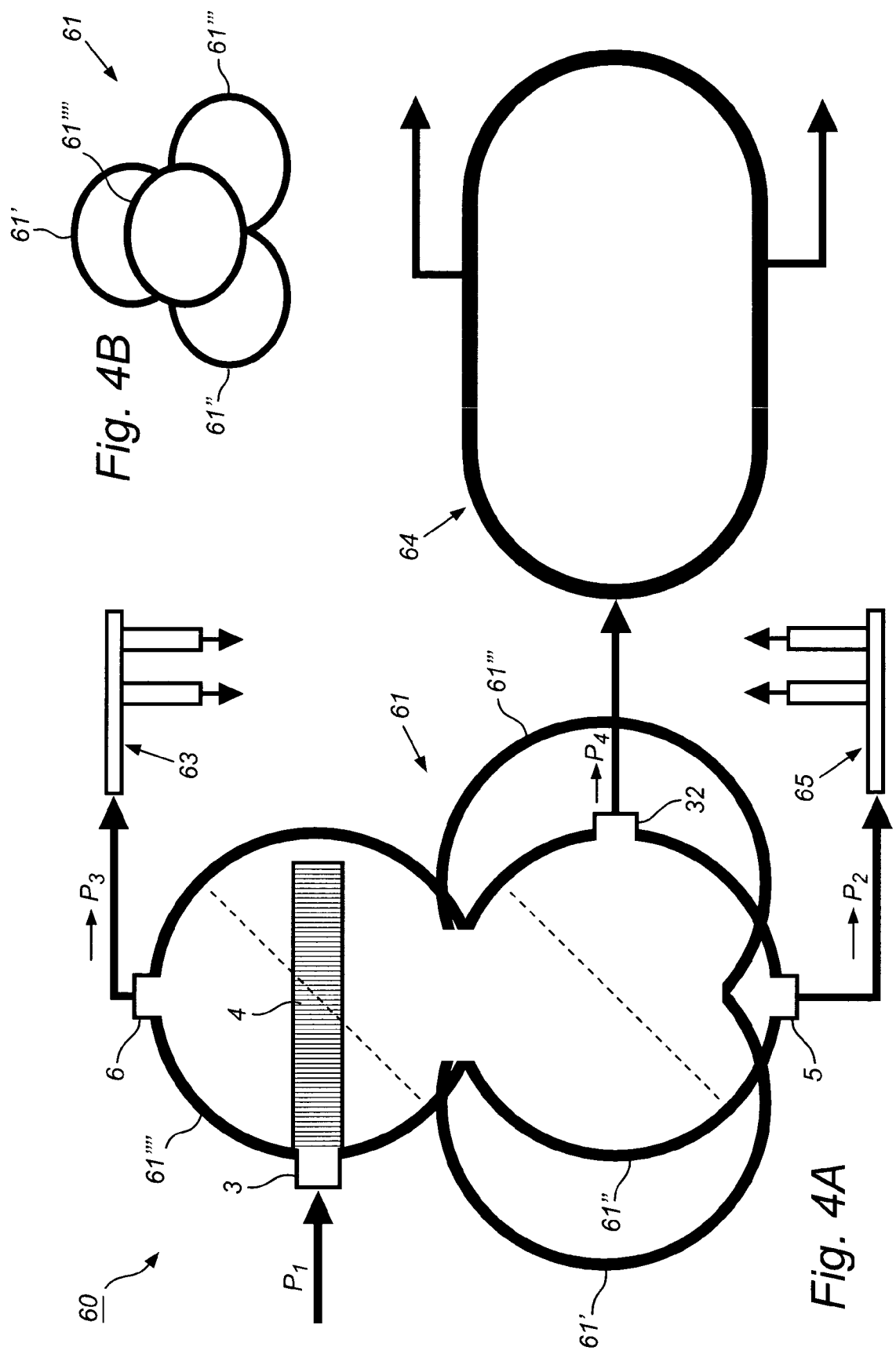
FIG. 4A shows an schematically represented fourth embodiment of the separation apparatus with additional subsequent processing equipment according the present invention.
FIG. 4B shows an schematically represented top view of the separation apparatus as presented in FIG. 3A, excluding the subsequent processing equipment.

A next embodiment of a separation apparatus 60 is schematically shown in FIGS. 4A and 4B. Here a vessel 61 is an assembly of four spherical vessel parts 61', 61", 61'", 61"". The heavy phase fraction outlets (e.g. oil fraction outlet 32 and water fraction outlet 5) are located below the liquid level of the fluid mixture that may accumulate on the underside of the vessel 61, in this situation the both the heavy phase fraction outlet 5 (e.g. water outlet) and the additional fraction outlet 32 (e.g. oil outlet) connect to lower vessel part 61". The light phase fraction outlet 6 (e.g. gas outlet) is located on the topside of the vessel 61, so connects to upper vessel part 61"". Also here the subsequent separators 63, 64, 65 may be varied as has been shown in the previously. In FIG. 4B only the vessel 61 is shown in a top view further illustrating the vessel 61 being an assembly of four spherical vessel parts 61', 61", 61'", 61"".

Figure 5:
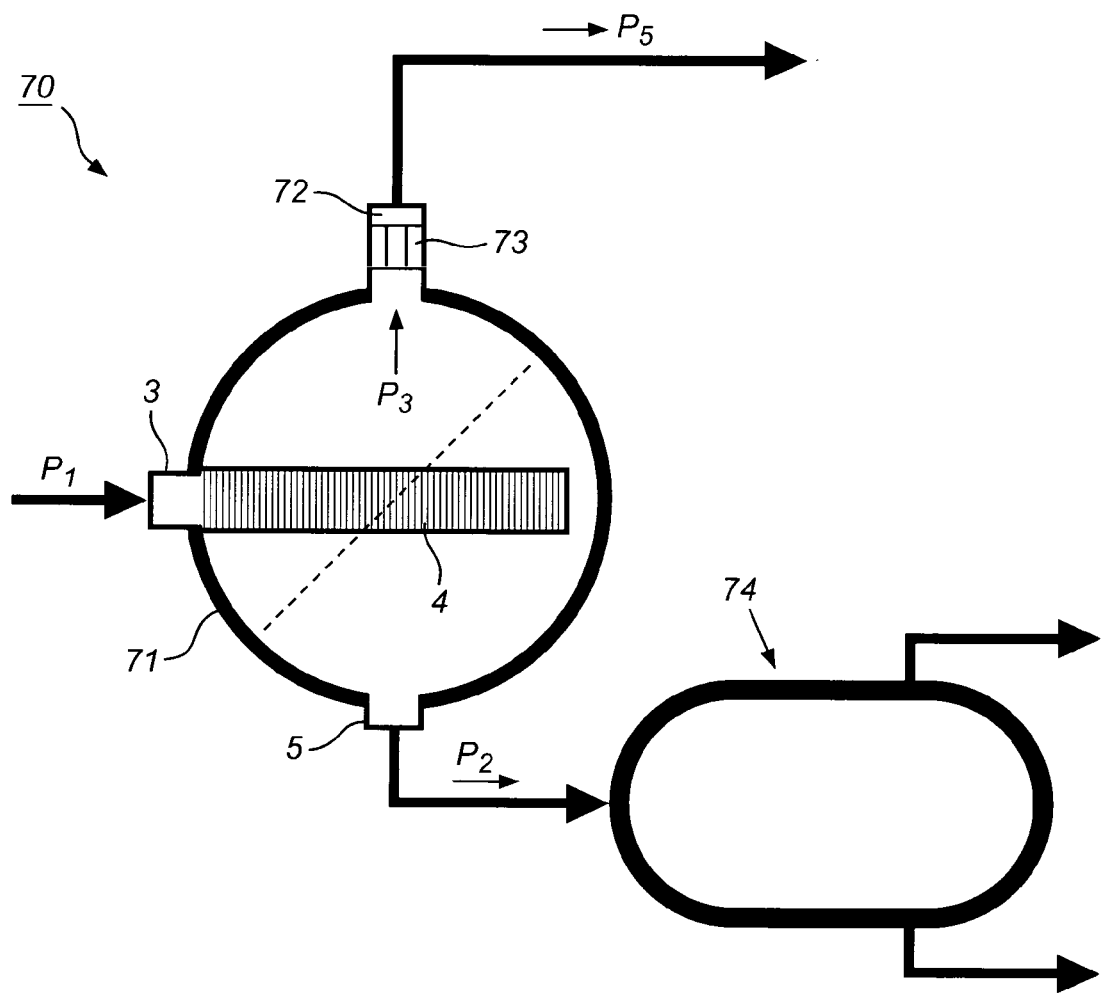
FIG. 5 shows an schematically represented fifth embodiment of the separation apparatus with additional subsequent processing equipment according the present invention.

FIG. 5 shows an embodiment of a separation apparatus 70 according the present invention that is more or less in line with the embodiment as shown in FIG. 1A however in this embodiment spherical vessel 71 with inlet 3 for feeding the wellstream mixture according arrow $P_1$ is now provided with a light phase outlet 72 (e.g. a gas outlet) that is provided with an integrated separator 73 for the subsequent separation of the substantial light phase fraction ($P_3$) (e.g. a gas phase fraction) that has been pre-separated in the vessel 71. Now the separator 73 integrated in light phase fraction outlet 72 (e.g. a substantial gas phase fraction outlet) can directly dispose the subsequent separated heavy phase fraction (e.g. a substantially liquid phase fraction) in the vessel 71, the dual separated light phase fraction (e.g. gas phase fraction) is further removed according arrow $P_5$. The heavy phase outlet 5 for the pre-separated substantial heavy phase fraction ($P_2$) (e.g. substantially liquid phase fraction) connects to a subsequent vessel separator 74 but could also be integrated with the vessel as an alternative embodiment that is also part of the present invention.

Figure 6:
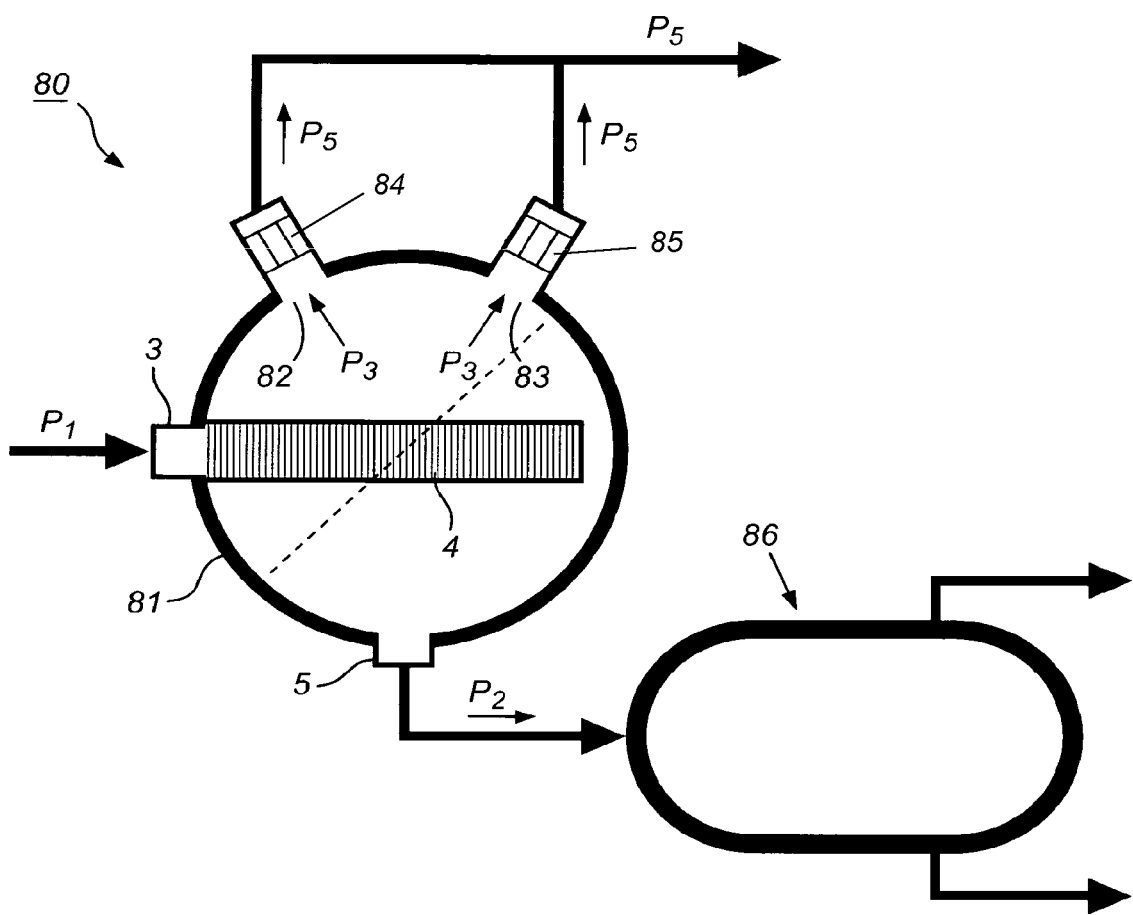
FIG. 6 shows a schematically represented sixth embodiment of the separation apparatus with additional subsequent processing equipment according the present invention.

Yet a next embodiment of a separation apparatus 80 according the present invention is shown in FIG. 6. Here a spherical vessel 81 is provided with dual light phase fraction outlets 82, 83 (e.g. gas phase outlets) both provided with an integrated separator 84, 85 for the subsequent separation of the light phase fraction ($P_3$) (e.g. substantial gas phase fraction) that has been pre-separated in the vessel 81. The dual separated light phase fractions are combined and further removed according arrows $P_5$. In line with the embodiment shown in FIG. 5 also here the heavy phase fraction outlet 5 for the pre-separated heavy phase fraction ($P_2$) (e.g. substantial liquid phase fraction) connects to a subsequent vessel separator 86.

Figure 7:
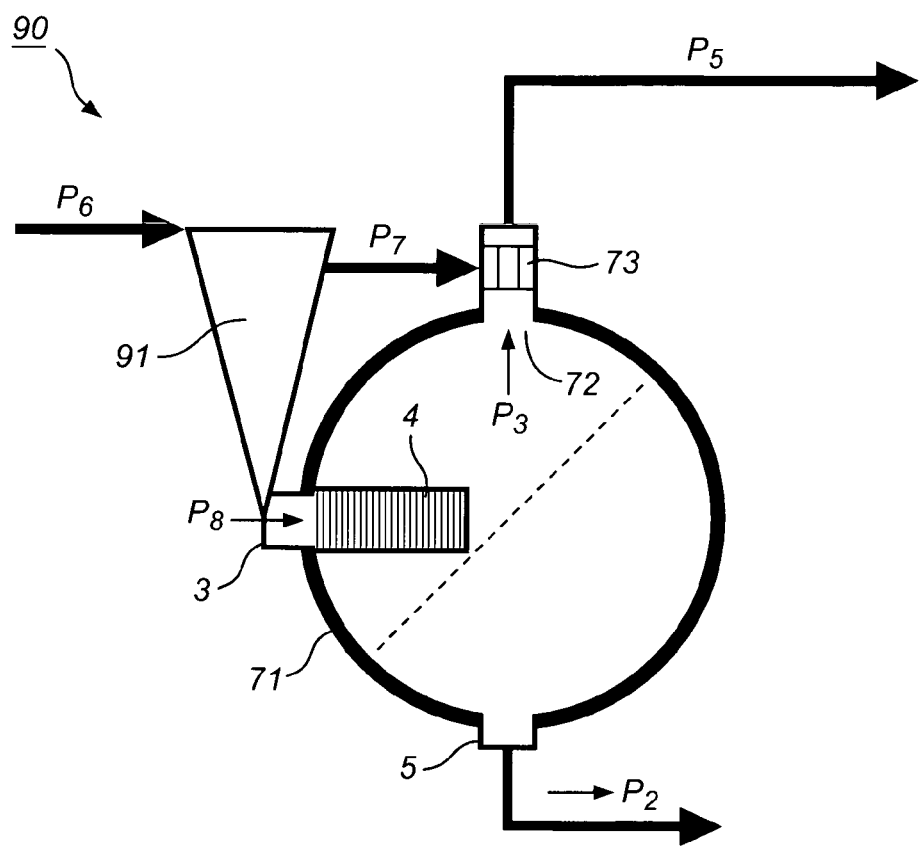
FIG. 7 shows an schematically represented seventh embodiment of the separation apparatus according the present invention.

Finally the embodiment of a separation apparatus 90 that is partially shown in FIG. 7 is in line the embodiment shown in FIG. 5. As done before identical equipment parts are referred to with reference signs as used in earlier embodiments. The difference here compared to the embodiment according FIG. 5 is that before the wellstream mixture is fed to the spherical vessel 71 the mixture is fed according arrow $P_6$ to a pre-separator 91 from where a pre-separated light phase fraction is directly fed to the separator 73 integrated in light phase outlet 72 according arrow $P_7$. The remaining pre-separated mixture leaving the pre-separator 91 is fed according arrow $P_8$ to the inlet 3 of the vessel 71.

The invention claimed is:

1. A separation apparatus for separation of volume flows of mixtures provided with at least two immiscible phases, comprising:
    a vessel provided with:
        an inlet for the mixture provided with the at least two immiscible phases;
        a separation interior;
        at least one heavy phase outlet for a separated heavy phase fraction located on a lower side of the vessel and being connected with a first subsequent separator located outside of the vessel and downstream of the heavy phase outlet, wherein the separated heavy phase fraction leaving the separator through the heavy phase outlet is fed to the first subsequent separator;
        a light phase outlet for a separated light phase fraction located above the heavy phase outlet and being connected with a second subsequent separator located outside of the vessel and downstream of the light phase outlet, wherein the separated light phase fraction leaving the vessel through the light phase outlet is fed to the second subsequent separator;
    wherein the vessel comprises at least one substantially spherical shaped casing to be designed for use under a higher external pressure than 1 atmosphere, and
    wherein at least one of the first or second subsequent separators is a compact separator,
    wherein the compact separator is selected from the group consisting of: centrifugal separators, cyclone separators, coalescers and vortex separators, and
    wherein in the separation interior of the vessel a vane diffuser comprising a plurality of vanes is connected to the inlet for enabling separation of the mixture.

2. The separation apparatus according to claim 1, wherein at the lower side of the vessel a solid particle outlet is provided.

3. The separation apparatus according to claim 1, wherein the apparatus is designed for use wherein the external pressure is higher than the internal pressure.

4. The separation apparatus according to claim 1, wherein the vessel comprises plural interconnected spherical shaped casings.

5. The separation apparatus according to claim 4, wherein the vessel comprises at least two stacked and interconnected spherical shaped casings.

6. The separation apparatus of claim 1, wherein the second separator contains a light phase outlet and a heavy phase outlet, where the heavy phase out of the second separator does not feed into the vessel.

7. The separation apparatus according to claim 1, wherein both the first and second subsequent separators are compact separators, wherein the compact separators are individually selected from the group consisting of: centrifugal separators, cyclone separators, coalescers and vortex separators.

8. The separation apparatus according to claim 1, wherein the separation apparatus is submerged underwater.

9. The separation apparatus according to claim 7, wherein the separation apparatus is located at the seabed.

10. A method for separation of volume flows of a wellstream mixture provided with at least two immiscible phases comprising the steps of:
    A) feeding a volume flow of the wellstream mixture to a vessel provided with at least one substantially spherical shaped casing and a separation interior having a vane diffuser connected to an inlet for enabling separation of the well stream mixture;
    B) pre-separating the wellstream mixture in the vessel;
    C) feeding a separated heavy phase fraction leaving the vessel to a first subsequent separator,
    D) feeding a separated light phase fraction leaving the vessel to a second subsequent separator,
    E) subsequent separation of the separated heavy phase fraction and the separated light phase fraction in the respective first and second subsequent separators,
    wherein at least one of the first or second subsequent separators is a compact separator selected from the group consisting of: centrifugal separators, cyclone separators, coalescers and vortex separators,
    wherein the method is performed in the apparatus of claim 1.

11. The separation method according to claim 10, wherein the subsequent separation processes of the separated heavy phase fraction and the separated light phase fraction both take place by through flow of the fractions through the subsequent separators.

12. The separation method according to claim 10, wherein the wellstream mixture is pre-separated in the vessel according step B) providing two different pre-separated wellstream fractions.

13. The separation method according to claim 10, wherein the separated light phase fraction leaving the vessel contains less than 40 volume % of liquid.

14. The separation method according to claim 13, wherein the separated light phase fraction leaving the vessel contains less than 30 volume % of liquid.

15. The separation method according to claim 14, wherein the separated light phase fraction leaving the vessel contains less than 20 volume % of liquid.

16. The separation method according to claim 10, wherein the separation apparatus is submerged underwater.

17. The separation method according to claim 16, wherein the separation apparatus is located at the seabed.

18. A separation apparatus for separation of volume flows of mixtures provided with at least two immiscible phases, comprising:
   a vessel provided with:
      an inlet for the mixture provided with the at least two immiscible phases;
      a separation interior;
      at least one heavy phase outlet for a separated heavy phase fraction located on a lower side of the vessel and being connected with a first subsequent separator located outside of the vessel and downstream of the heavy phase outlet, wherein the separated heavy phase fraction leaving the separator through the heavy phase outlet is fed to the first subsequent separator;
      a light phase outlet for a separated light phase fraction located above the heavy phase outlet and being connected with a second subsequent separator located outside of the vessel and downstream of the light phase outlet, wherein the separated light phase fraction leaving the vessel through the light phase outlet is fed to the second subsequent separator;
   wherein the vessel comprises at least one substantially spherical shaped casing to be designed for use under a higher external pressure than 1 atmosphere, and
   wherein at least one of the first or second subsequent separators is a compact separator,
   wherein the compact separator is selected from the group consisting of: centrifugal separators, cyclone separators, coalescers and vortex separators,
   wherein in the separation interior of the vessel a vane diffuser comprising a plurality of vanes is connected to the inlet for enabling separation of the mixture, and
   wherein both the first and second subsequent separators are compact separators, wherein the compact separators are individually selected from the group consisting of: centrifugal separators, cyclone separators, coalescers and vortex separators.

\* \* \* \* \*